United States Patent
Chang

(10) Patent No.: US 8,767,832 B2
(45) Date of Patent: Jul. 1, 2014

(54) METHOD AND APPARATUS FOR PROCESSING A MULTIMEDIA BITSTREAM

(75) Inventor: Yung-Chang Chang, Taipei (TW)

(73) Assignee: Mediatek Inc., Hsinchu (TW)

( * ) Notice: Subject to any disclaimer, the term of this patent is extended or adjusted under 35 U.S.C. 154(b) by 680 days.

(21) Appl. No.: 12/401,056

(22) Filed: Mar. 10, 2009

(65) Prior Publication Data

US 2010/0232517 A1 Sep. 16, 2010

(51) Int. Cl.
*H04N 7/12* (2006.01)
(52) U.S. Cl.
USPC ................................. 375/240.16
(58) Field of Classification Search
USPC ....................... 375/240.01, 240.26
IPC ...................................... H04N 7/12
See application file for complete search history.

(56) References Cited

U.S. PATENT DOCUMENTS

| 7,415,069 | B2 | 8/2008 | Winger |
| 8,170,108 | B2* | 5/2012 | Jeon et al. ................. 375/240.16 |
| 2004/0010802 | A1 | 1/2004 | Visharam |
| 2004/0228413 | A1* | 11/2004 | Hannuksela ............. 375/240.25 |
| 2005/0123055 | A1 | 6/2005 | Winger |
| 2009/0003429 | A1* | 1/2009 | Chang et al. .................. 375/240 |
| 2009/0201990 | A1* | 8/2009 | Leprovost et al. ....... 375/240.12 |

* cited by examiner

*Primary Examiner* — Dave Czekaj
*Assistant Examiner* — Tracy Li
(74) *Attorney, Agent, or Firm* — Grossman, Tucker, Perreault & Pfleger, PLLC

(57) ABSTRACT

A method and apparatus for processing a multimedia bitstream are provided. The apparatus comprises a receive module, an extraction module, and a generation module. The receiving module receives the multimedia bitstream, wherein the multimedia bitstream comprises a plurality of NAL units. The extraction module extracts the NAL units from the multimedia bitstream. The generation module generates a processed bitstream comprising markers and NAL units. Each of the markers has a unique code. By doing so in future processing, a decoder or a decoding method can locate NAL units easily by searching for the corresponding marker.

13 Claims, 3 Drawing Sheets

METHOD AND APPARATUS FOR PROCESSING A MULTIMEDIA BITSTREAM

CROSS-REFERENCES TO RELATED APPLICATIONS

Not applicable.

BACKGROUND OF THE INVENTION

1. Field of the Invention

The present invention relates to a method and an apparatus for processing a multimedia bitstream. More particularly, the present invention relates to a method and an apparatus for processing a multimedia bitstream comprising a plurality of Network Abstraction Layer (NAL) units.

2. Descriptions of the Related Art

The H.264 standard is one of the newest video coding standards. The H.264 standard outperforms the earlier MPEG-4 and H.263 standards in terms of compression performance, in addition to supporting network-friendly video coding/transmission. The network Abstraction Layer (NAL) units play an important role in the H.264 standard for superior performance.

There are two different approaches to pack NAL units: one is the byte-stream-oriented approach and the other is the packet-oriented approach. In the byte-stream-oriented approach, the start code prefixes are used so that the boundaries of the NAL units can be easily identified. In the packet-oriented approach, there is no start code prefix. The ISO Base Media File Format (e.g., MP4, MJ2) uses the packet-oriented approach to pack NAL units. For the bitstream that conforms to the ISO Base Media File Format, the coded data is carried in payloads of the bitstream. There is no start code prefix in the payloads to indicate the boundaries of the NAL units.

Traditionally, the decoder decodes the bitstream conforming to the ISO Base Media File Format by parsing the payloads. To parse the payload, the decoder has to be equipped with a counter. The header of the corresponding payloads records the number of bytes comprised in the payloads. Therefore, with the assistance of the counter, the decoder can parse according to the number of byes to derive the NAL units.

The performance of processing the packet-oriented bitstream such as a bitstream conforming to the ISO Base Media File Format is usually not satisfied for several reasons. First, an apparatus has to be equipped with an extra memory for storing the byte sizes of NAL units and a byte counter, which increases the hardware complexity and production cost. Additionally, the performance of error concealment is not satisfied because it is difficult for the decoder to skip the error portion and identify the next slice by locating the next NAL unit.

According to the aforementioned description, there is a need to improve the performance of processing the bitstream that packs NAL units by using the packet-oriented approach.

SUMMARY OF THE INVENTION

An objective of this invention is to provide a method for processing a multimedia bitstream. The method comprises the following steps: receiving the multimedia bitstream comprising an NAL unit, extracting the NAL unit from the multimedia bitstream, and generating a processed bitstream comprising a marker and the NAL unit.

Another objective of this invention is to provide an apparatus for processing a multimedia bitstream. The apparatus comprises a receiving module, an extraction module, and a generation module. The receiving module is configured to receive the multimedia bitstream, wherein the multimedia bitstream comprises the NAL unit. The extraction module is configured to extract the NAL unit from the multimedia bitstream. The generation module is configured to generate a processed bitstream comprising a marker and the NAL unit.

The present invention generates the processed bitstream that comprises NAL units and markers. By doing so in future processing, a decoder or a decoding method can locate NAL units easily by searching for the corresponding marker. The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the descriptions that follow, the present invention will be described in reference to the embodiments that describe a method and an apparatus for processing a bitstream. However, the embodiments of the invention are not limited to any particular environment, application, or implementation. Therefore, the descriptions of the embodiments that follow are for purposes of illustration and not limitation. It is understood that elements indirectly related to the present invention are omitted and are not shown in the following embodiments and drawings.

Figure 1:
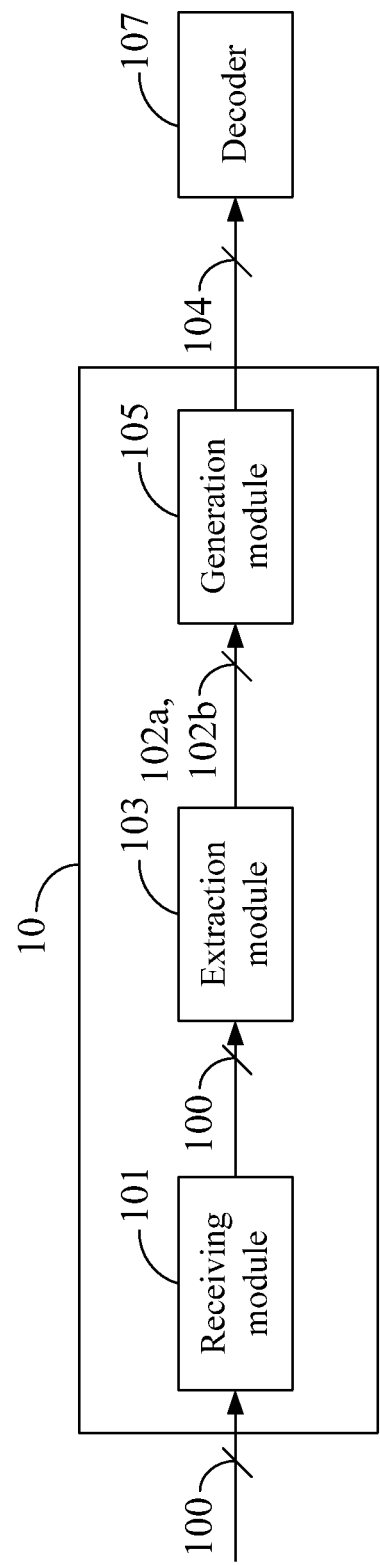
FIG. 1 illustrates a first embodiment of the present invention.
Figure 2:
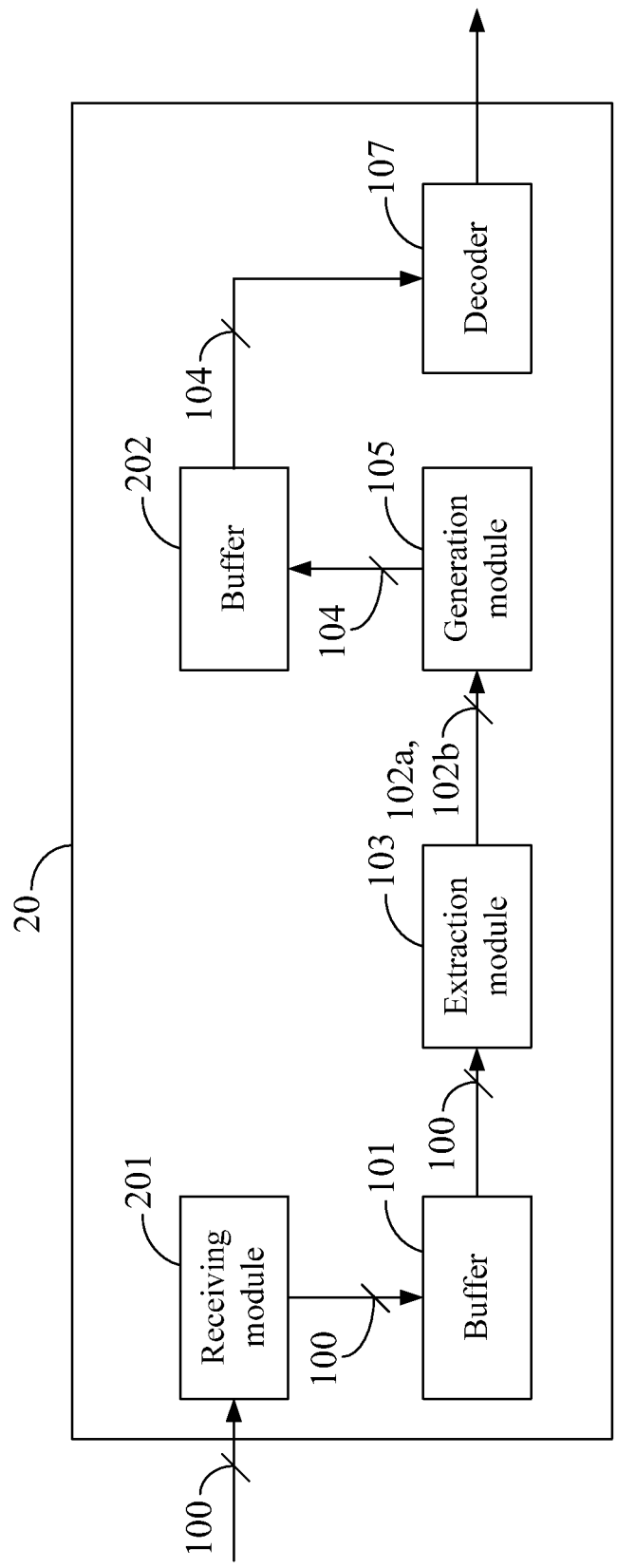
FIG. 2 illustrates a second embodiment of the present invention.

FIG. 1 illustrates a first embodiment of the present invention, which is an apparatus 10 for processing a multimedia bitstream 100. The apparatus 10 is connected to a decoder 107 that conforms to the H.264 standard. The apparatus 10 can be viewed as a preprocessor of the decoder 107.

The multimedia bitstream 100 conforms to an ISO base media file format and comprises a plurality of video payloads. Each of the video payloads comprises at least one Network Abstraction Layer (NAL) unit and a header recording a number of bytes comprised in the video payloads. It is assumed that both the first and second video payloads comprise an NAL unit. For convenience, the NAL unit comprised in the first video payload is called the first NAL unit, while the NAL unit comprised in the second video payload is called the second NAL unit. It is noted that the multimedia bitstream 100 of the present invention is not limited to the ISO base media file format. In addition, the apparatus 10 is able to preprocess the multimedia bitstream 100 while the NAL units comprised in the multimedia bitstream 100 do not contain any start code prefixes.

The apparatus 10 comprises a receiving module 101, an extraction module 103, and a generation module 105. When the apparatus 10 functions, the receiving module 101 receives the multimedia bitstream 100. The receiving module 101 transmits the multimedia bitstream 100 to the extraction module 103 so that the extraction module 103 can extract the first NAL unit 102a from the multimedia bitstream 100. Specifically, the extraction module 103 extracts the first NAL unit 102a by parsing the first video payload according to the number of bytes indicated in the header of the first video payload.

In response to the extraction of the first NAL unit 102a, the generation module 105 generates a processed bitstream 104 that comprises a first marker and the first NAL unit 102a. More particular, the generation module 105 generates the processed bitstream 104 by placing the first marker in front of the NAL unit 102a, wherein the first marker is a unique code. The marker is used to assist the decoding process by identifying the boundary of the payload sections in the packet. For example, a marker is used as the identification of a video payload section. Thus, by searching the marker, the boundary of the video payload sections in the packet can be easily identified for decoding.

The extraction module 103 further extracts the second NAL unit 102b from multimedia stream 100 by parsing the second video payload according to the number of byes indicated in the header of the second video payload. Similarly, in response to the extraction of the second NAL unit 102b, the generation module 105 generates the processed bitstream 104 that comprises a second marker and the second NAL unit 102b by placing the second marker in front of the second NAL unit 102b. It is noted the second marker is identical to the first marker. For the rest of the video payloads, the extraction module 103 also extracts NAL units from them and the generation module 105 generates the processed bitstream 104 by placing a marker right in front of each of the extracted NAL units.

After the apparatus 10 processes the multimedia bitstream 100 into the processed bitstream 104, the processed bitstream 104 is transmitted to the decoder 107. Since each of the NAL units in the processed bit stream 104 has a corresponding marker, the decoder 107 can decode the processed bitstream 104 more efficiently. In other words, with the assistance of the apparatus 10, the decoder 107 does not have to be equipped with a counter to count byte numbers and an extra memory to store byte sizes of NAL units. In addition, when an error is detected, the decoder 107 can easily find the next NAL unit for display by searching the marker of the next NAL unit. Consequently, with the apparatus 10, the hardware complexity of the decoder 107 can be reduced and the decoding performance of the decoder 107 can be improved.

A second embodiment of the present invention is an apparatus 20 for processing a multimedia bitstream 100. In this embodiment, the content of the multimedia bitstream 100 is the same as that in the first embodiment. The apparatus 20 also comprises a receiving module 101, an extraction module 103, a generation module 105, buffers 201, 202, and a decoder 107. The decoder 107 conforms to the H.264 standard. Some functionalities and operations of the apparatus 20 are similar to the apparatus 10 of the first embodiment. Similar parts will not be detailed in this embodiment.

The receiving module 101 receives the multimedia stream 100 and then temporarily stores the multimedia stream 100 in the buffer 201. The extraction module 103 then retrieves the multimedia stream 100 from the buffer 201 for extraction. The extraction module 103 also extracts the first NAL unit 102a, the second NAL unit 102b, and the rest NAL units from the multimedia bitstream 100. The generation module 105 generates a processed bitstream 104 comprising a first marker, the first NAL unit 102a, a second marker, the second NAL unit 102b, several other markers, and the rest NAL units. More specifically, the generation module 105 places the first marker in front of the first NAL unit 102a and places the second marker in front of the second NAL unit 102b. For each of the rest of the NAL units, the generation module 105 places one marker right in front of the unit. The first marker, the second marker, and the rest markers are identical. The processed bitstream 104 is stored in the buffer 202.

The decoder 107 retrieves the processed bitstream 104 from the buffer 102 and then decodes the bitstream 104. The decoder 107 locates the first NAL unit 102a by searching for the first marker. After the decoder 107 locates the first NAL unit 102a, the decoder 107 decodes the first NAL unit 102a. The decoder 107 may use any decoding algorithm that conforms to the H.264 standard to decode the first NAL unit 102a. The decoder 107 may decode the first NAL unit 102a correctly or erroneously. If the decoder 107 determines that the decoded first NAL unit is erroneous, the decoder 107 jumps to the second NAL unit 102b. The decoder 107 locates the second NAL unit in the processed bitstream 300 by searching for the second marker. After the second NAL unit has been located, the decoder 107 decodes the second NAL unit. Since the first and second markers are unique codes, the decoder 107 can simply search for the markers (i.e. unique codes) without other complicated methods. The decoder 107 then continuously locates and decodes the rest NAL units in the processed bitstream 104. Similarly, when a decoded NAL unit is determined to be erroneous, the decoder 107 locates the next NAL unit and then jumps to decode the next NAL unit.

When the decoder 107 is requested to be fast forwarded or backwards, the decoder 106 also locates the appropriate NAL unit by searching for the marker and then decodes the located NAL units. Like the first embodiment, the decoder 107 can decode the processed bitstream 104 more efficiently because each of the NAL units in the processed bit stream 104 has a corresponding marker. The apparatus 10 has an extraction module 103 and generation module 105 to preprocess the multimedia bitstream 100 into the processed bitstream 104. As a result, the decoder 107 that usually has to function in real time can decode the NAL units in the processed bitstream 104 more efficiently. When an error occurs, the apparatus 20 can quickly locate the next NAL. Therefore, the apparatus 20 can enhance error concealment ability.

Figure 3:
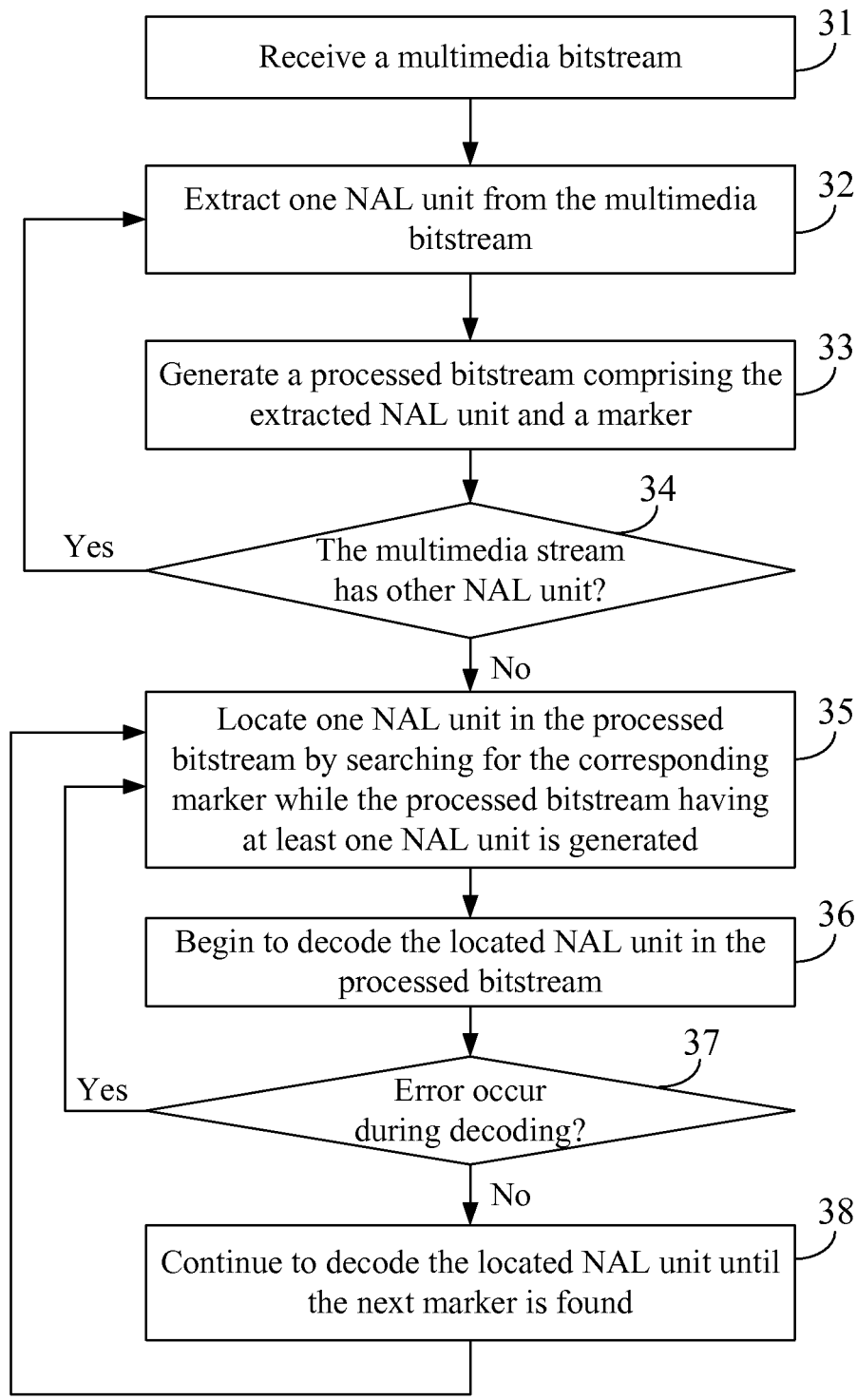
FIG. 3 illustrates an exemplary flow diagram of the present invention.

A flow diagram in FIG. 3 illustrates a method for processing a multimedia bitstream according to the present invention. The method is adapted for an apparatus such as the apparatuses 10, 20.

First, the method executes step 31 to receive a multimedia bitstream, wherein the multimedia bitstream comprises a plurality of NAL units. For convenience, one of the NAL units is called the first NAL unit, while the second one of the NAL units is called the second NAL unit. Then, step 32 is executed to extract one NAL unit from the multimedia bitstream. Since the step 32 is executed for the first time, the extracted NAL unit is the first NAL unit. Step 33 is then executed to generate a processed bitstream comprising a marker and the NAL unit extracted in the step 32, wherein the marker is a unique code. Specifically, the step 33 generates the processed bitstream by placing the marker right in front of the extracted unit. Since the step 33 is executed for the first time, the added marker is called the first marker.

Step 34 is then executed to determine whether the multimedia bitstream has other NAL unit. If so, the method goes back to step 32 to extract the next NAL from the multimedia stream. If the step 32 is executed for the second time, the extracted NAL unit is the second NAL unit. Then, the step 33 is executed again to generate the processed bitstream by placing a marker right in front of the extracted unit. If the step 33 is executed for the second time, the step 33 the marker is called the second marker. Then, the step 34 is executed again to determine whether the multimedia bitstream still has other NAL unit. If so, the method still goes back to step 31.

If step 34 determines that the multimedia stream does not have other NAL units, then step 35 is executed. Step 35 locates one NAL unit in the processed bitstream by searching for the corresponding marker while the processed bitstream having at least one NAL unit is generated. For example, if the step 35 is executed for the first time, the step 35 locates the first NAL unit by searching for the first marker. If the step 35 is executed for the second time, the step 35 locates the second NAL unit by searching for the second marker. Once the marker is found, the corresponding NAL is behind the marker.

Next, step 36 begins to decode the NAL unit located in the step 35. Similarly, if the step 36 is executed for the first time, the NAL unit decoded by the step 36 is the first NAL unit. If the step 36 is executed for the second time, the NAL unit decoded by the step 36 is the second NAL unit. During decoding, step 37 is executed to determine whether the decoded NAL unit is erroneous. If so, then the method stops decoding the located NAL unit and goes to step 35. If step 37 determines that the decoded NAL unit is correct, the method executes step 38 to continue decoding the NAL unit until the next marker is found. After step 38, the method goes to step 35 to process other NAL units in the processed bitstream.

It is noted in some other embodiments that the method may bypass the step 34. Once the processed bitstream comprising the extracted NAL unit and a marker is generated in step 33, the step 35 is executed to locate one NAL unit in the processed bitstream by searching for the corresponding marker without determining whether the multimedia stream has other NAL unit. In some other embodiments, the processed bitstream comprising the extracted NAL unit and a marker is generated in step 33 and step 34 is then executed to determine whether the multimedia bitstream has other NAL unit. The step 35 is executed to locate one NAL unit in the processed bitstream by searching for the corresponding marker while the first NAL unit of the processed bitstream is generated. The step 35 is able to be executed before the step of determining whether the multimedia bitstream has other NAL unit is completed as long as there is one processed bitstream having at least one complete NAL unit exists.

In addition to the aforementioned steps, the methods in which the flow diagram executes these operations and functions will be readily appreciated by those of ordinary skill in the art based on the explanation of the first and second embodiments, and thus will not be further described herein.

The method illustrated in FIG. 3 may be realized by a computer program. The computer program may be stored on a computer readable medium. The computer readable medium may be a read only memory (ROM), a flash memory, a floppy disk, a hard disk, a compact disk, a mobile disk, a magnetic tape, a database accessible to networks, or any other storage media with the same function and well known to those skilled in the art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for processing a multimedia bitstream, comprising the steps of:

(a) receiving, by a receiving module of an apparatus, the multimedia bitstream comprising a first Network Abstraction Layer (NAL) unit and a second NAL unit;

(b) extracting, by an extraction module of the apparatus, the first NAL unit from the multimedia bitstream;

(c) extracting, by the extraction module, the second NAL unit from the multimedia bitstream;

(d) generating, by a generation module of the apparatus, a processed bitstream to be directly inputted to a fast-forward decoder, the processed bitstream comprising a first marker, the first NAL unit extracted from the multimedia bitstream, a second marker, and the second NAL unit extracted from the multimedia bitstream, wherein the first marker and the second marker are identical(e) locating, by the fast-forward decoder, the first NAL unit in the processed bitstream by searching for the first marker;

(e) decoding, by the fast-forward decoder, the first NAL unit in the processed bitstream; and (g) determining, by the fast-forward decoder, whether the decoded first NAL unit being erroneous;

wherein when the step (g) determines that the first NAL unit is erroneous, the method further comprises the following steps of:

(h) locating, by the fast-forward decoder, the second NAL unit in the processed bitstream by searching for the second marker; and (i) decoding, by the fast-forward decoder, the second NAL unit;

wherein when the step (g) determines that the first NAL unit is not erroneous, the method further comprises the following step of:

(j) decoding, by the fast-forward decoder, the first NAL unit continuously until a next maker is found.

2. The method as claimed in claim 1, wherein the step (e) conforms to the H.264 standard.

3. The method as claimed in claim 1, wherein the multimedia bitstream conforms to an ISO base media file format.

4. The method as claimed in claim 1, wherein the first marker is a unique code.

5. The method as claimed in claim 1, wherein the step (d) generates, by the generation module, the processed bitstream by placing the first marker in front of the first NAL unit and placing the second marker in front of the second NAL unit.

6. The method as claimed in claim 4, wherein the first marker is used to identify the boundary of a payload section in the processed bitstream.

7. An apparatus for processing a multimedia bitstream, comprising:

a receiving module being configured to receive the multimedia bitstream, the multimedia bitstream comprising a first NAL unit and a second NAL unit;

an extraction module being configured to extract the first NAL unit and the second NAL unit from the multimedia bitstream individually;

a generation module being configured to generate a processed comprising a first marker, the first NAL unit extracted from the multimedia bitstream, a second marker, and the second NAL unit extracted from the multimedia bitstream, wherein the first marker and the second marker are identical; and a fast-forward decoder being configured to locate the first NAL unit in the processed bitstream by searching for the first marker, decode the first NAL unit in the processed bitstream, and determine whether the decoded first NAL unit is erroneous, wherein when the first NAL unit is erroneous, the fast-forward decoder further locates the second NAL unit in the processed bitstream by searching for the second marker and decodes the second NAL unit, and wherein when the first NAL unit is not erroneous, the fast-forward decoder continues to decode the first NAL unit until a next maker is found.

8. The apparatus as claimed in claim 7, wherein the decoder conforms to the H.264 standard.

9. The apparatus as claimed in claim 7, further comprising a buffer being configured to store the processed bitstream.

10. The apparatus as claimed in claim 7, further comprising a buffer being configured to store the multimedia bitstream.

11. The apparatus as claimed in claim 7, wherein the multimedia bitstream conforms to an ISO base media file format.

12. The apparatus as claimed in claim 7, wherein the first marker is a unique code.

13. The apparatus as claimed in claim 7, wherein the generation module generates the processed bitstream by placing the first marker in front of the first NAL unit.

* * * * *